US006223446B1

(12) United States Patent
Potter (10) Patent No.: US 6,223,446 B1
(45) Date of Patent: May 1, 2001

(54) GRADE/LEVEL MEASURING DEVICE (76) Inventor: Mark A. Potter, 5244 Neptune Sq., Oxnard, CA (US) 93030

( * ) Notice: Subject to any disclaimer, the term of this patent is extended or adjusted under 35 U.S.C. 154(b) by 0 days.

(21) Appl. No.: 09/305,663

(22) Filed: May 5, 1999

(51) Int. Cl.[7] .................................................. G01B 3/10
(52) U.S. Cl. ...................................... 33/764; 33/DIG. 21
(58) Field of Search ............................. 33/760, 764, 768, 33/DIG. 21

(56) References Cited

U.S. PATENT DOCUMENTS

| D. 299,437 | 1/1989 | Kull | D10/62 |
|---|---|---|---|
| D. 311,874 | 11/1990 | Ingram, II | D10/72 |
| D. 332,413 | 1/1993 | Douglas | D10/72 |
| D. 349,462 | 8/1994 | Douglas | D10/62 |
| D. 373,090 | 8/1996 | Bennett | D10/72 |
| 1,473,877 | 11/1923 | Rome . | |
| 2,240,753 * | 5/1941 | Bouchard et al. | 33/764 |
| 3,191,308 | 6/1965 | Lindenau | 33/87 |
| 3,514,863 * | 6/1970 | Moll | 33/764 |
| 3,526,964 | 9/1970 | Clark, Jr. | 33/27 |
| 3,568,322 | 3/1971 | Showers | 33/27 |
| 3,763,569 | 10/1973 | Merlat | 33/138 |
| 3,812,587 * | 5/1974 | Elkins et al. | 33/764 |
| 3,885,314 * | 5/1975 | Banas, Sr. | 33/764 |
| 4,228,588 | 10/1980 | Horton, Jr. | 33/1 |
| 4,274,203 | 6/1981 | Vasile | 33/1 |
| 4,438,538 | 3/1984 | Larsen | 7/164 |
| 4,459,758 | 7/1984 | Halle | 33/274 |
| 4,681,439 | 7/1987 | Shoemaker | 356/154 |
| 4,697,349 | 10/1987 | Lee | 33/27.03 |
| 4,700,489 * | 10/1987 | Vasile | 33/760 |
| 5,075,977 * | 12/1991 | Rando | 33/DIG. 21 |
| 5,092,057 | 3/1992 | Hoenig, Sr. | 33/669 |
| 5,357,683 * | 10/1994 | Trevino | 33/764 |
| 5,519,942 | 5/1996 | Webb | 33/290 |
| 5,539,990 | 7/1996 | Le | 33/283 |
| 5,551,159 | 9/1996 | Mooty | 33/228 |
| 5,784,792 | 7/1998 | Smith | 33/227 |
| 5,894,675 * | 4/1999 | Cericola | 33/760 |

* cited by examiner

Primary Examiner—G. Bradley Bennett
(74) Attorney, Agent, or Firm—Kenneth J. Hovet; Arthur K. Samora (57) ABSTRACT

The present invention provides a small, simple and easy-to-use elevation checking and measuring device that can also be used to measure points to the same level as a known point. The invention comprises a primary housing and secondary casing which contain tape measuring blades. The primary housing has opposing sidewalls each of which may include a vertical slot. The slots are designed to mate with projections extending from the secondary casing. The slots and projections provide alternative angular orientations of the housing and casing when connected together. The primary housing contains level indicators to determine when it is held level. It also includes a light source that illuminates a target at the end of the primary housing blade. Maintaining the beam on the target while using the level indicators to achieve a horizontal orientation of the primary assembly, thereby permits a user to make quick and accurate grade or height measurements with the tape measure blades.

26 Claims, 7 Drawing Sheets

GRADE/LEVEL MEASURING DEVICE

BACKGROUND OF THE INVENTION

1. Field of the Invention

The invention relates to level and grade measuring devices and more particularly to a simple and easy-to-use level and grade measuring device employing tape measures, bubble indicators and a light beam.

2. Description of Related Art

Numerous devices have been developed to assist in the measurement and checking of site contours and elevations. The elevations of landmarks are, in the majority of cases, surveyed by means of a linear measuring instrument which requires the presence of two operators using complex and sensitive equipment. Such an operation is tedious, long and expensive. Moreover, the surveying done by two operators is conducted at the beginning of a project to determine the site topography. The survey instruments are not practical for quickly and easily checking grade levels and contours. For quick on-site use, the device should be small, self-contained, portable and easy-to-use.

Other devices have been developed that allow for use by a single operator. For instance, in U.S. Pat. No. 5,551,159 to Mooty, a laser level apparatus is disclosed for use by a single operator. The operator uses a grade pole having a movable laser level receiver. The receiver detects a laser signal from a mounted laser transmitter usually fixed on a tripod some distance from the device. An indicator electronically coupled to the receiver is used to provide the operator a response when the laser beam is detected. Although fairly accurate, this apparatus is complex, heavy and expensive. It requires the operator to first properly level the transmitter on the tripod, align the laser beam and then reposition the receiver to properly align the receiver to the laser beam.

U.S. Pat. No. 4,274,203 to Vasile also discloses a complex and bulky grade measuring device. The device is generally mounted on a tripod and uses two tape measures along with a conventional sighting device for aligning to a known point. One of the tape measures is used to measure the horizontal distance to the point and the other is used to measure the vertical height of the device above the ground. Bubble levels are mounted on the sighting mechanism to determine if it is level. The device also uses complex electronics to provide a digital display of the distance that the tape measures are extended. Again, the device is too bulky and complicated for quick and easy grade checking.

U.S. Pat. No. 4,459,758 to Halle also discloses a device for measuring and checking site contours and elevations. The patent discloses a rotatable table mounted on a tripod. The table holds a device which transmits a laser beam parallel to the table. The device also provides a measuring tape that can be extended parallel to the laser beam. When the table and tripod elevation is fixed, the laser beam illuminates an aimed point for the operator and the distance to the aimed point can be measured with the tape. Because of the tripod and table arrangement, this device is not capable of quick and easy measurements. In addition, the device does not provide a means for measuring the elevation of the table.

U.S. Pat. No. 5,784,792 to Smith discloses a hand held tool for use in checking the level or grade of ground surface at a construction area. The cylindrical device emits a laser beam from one end which is in axial alignment with the device housing. The housing contains a bubble level to ensure that the device is held level to the ground.

In use, the operator holds the device alongside an engineer's side stick or other measuring stick that rests on the ground. The device is aimed at a previously marked location. The user can check the level of the grade by sliding the device up or down the measuring stick. However, this device provides no means of measuring the horizontal distance from the device to the previously marked location. Also, the user must always possess a separate measuring stick to determine grade level.

Devices have also been developed to measure horizontal points above a reference point. U.S. Pat. No. 5,092,057 discloses a device with a bubble level to ensure that the device is horizontal. It includes a perpendicular measuring tape to determine the vertical distance to a point. The device also has slidable locator members to mark two horizontal points at a desired distance apart. However, this device provides no means to measure the horizontal distance to a point.

SUMMARY OF THE INVENTION

The present invention provides a small, simple and easy-to-use elevation checking and measuring device that can also be used to measure points to the same level as a known point. The invention comprises a primary tape measure assembly which can be used alone or in combination with a secondary tape measure assembly. Both assemblies have mounting means for effecting their engagement. The primary assembly comprises a housing with a first mounting structure and the secondary assembly comprises a casing with second and third mounting structures. Such structures may include mechanical fasteners, Velcro fasteners, clamps, magnets, clips and matching undercut parts known in the art.

The housing and casing both include a retractable tape measure mechanism with a blade that can be extended to a desired length. The primary assembly blade is provided with an end part having a target portion for illumination from a focused light source emitted from the primary assembly.

For illustrative purposes, the first mounting structure is shown in the drawings as a vertical slot on at least one housing sidewall. The slot is designed to mate with a second or third corresponding mounting structure shown as a projection extending from the casing of the secondary tape measure assembly. This construction permits releasable engagement of the assemblies in multiple orthogonal orientations.

In one preferred orientation of the combined assemblies, the secondary blade, when extended from the secondary assembly casing, will be perpendicular to the primary blade when it is extended from the primary assembly housing. As so disposed, the primary blade can be used to measure horizontal distance to a point, while the secondary blade can be used to measure vertical distance.

In another preferred orientation, the extended blades are perpendicular to each other, but the secondary blade from the casing will be in a horizontal plane that is parallel to the primary blade. As so disposed, the primary blade will measure the distance to a known point and the secondary blade can measure the distance to a point in a related horizontal plane which is perpendicular to the primary blade.

The primary housing may have one or more level indicating means to show whether the primary housing is horizontal and not angularly canted. The primary housing also has a light source that projects a light beam adjacent to and longitudinally aligned with the primary measuring blade. When the primary blade is extended and the primary housing is horizontal, the light beam will illuminate the blade end part target portion. The primary housing includes a light actuation switch, electronic componentry and internal batteries to power the light source.

The invention provides a simple, quick and easy to use device to coordinate height and elevation measurements and to check the grade on a construction site. A single operator can use the device which is small enough to be stowed in a tool box or on a tool belt. The device can also be used to determine horizontal points on a wall from a known point. This is particularly useful in hanging pictures and wall decorations.

These and other further features and advantages of the invention will be apparent to those skilled in the art from the following detailed description, taken together with the accompanying drawings.

DETAILED DESCRIPTION OF THE INVENTION

With reference now to the drawings, FIGS. 1–4 illustrate the construction of primary tape measure assembly 10. The primary tape measure assembly comprises a hollow housing 12 defining an interior for enclosing a coiled tape measure mechanism 22 depicted in phantom. The mechanism comprises a measuring blade that is coiled about a shaft 26 and is spring biased in a retracted position.

A variety of tape measure mechanisms known in the art may be used with the invention. As referenced herein, the term "blade" shall encompass strips of metal or fabric, marked wires, cords and any other measuring lines that are coilable within a small housing or casing.

The housing is defined by opposing mirror image sidewalls comprising first sidewall 14 and second sidewall 16. The sidewalls are interiorly supported by lateral housing posts 23 extending across selected areas of the housing interior. If the housing comprises bilateral housing parts, mechanical fasteners, such as rivets or screws, will be used to engage the posts for securing the parts together.

The housing is further characterized by an arcuate top wall 13 which tapers rearwardly into a back wall 15. The back wall merges into a curved end 60 from which extends an undercut wall 63. The undercut wall terminates at bottom wall 17 which defines a lowermost portion of the housing 12. The bottom wall extends to a front wall 19 which defines the front of the housing.

The lowermost portion of the front wall is provided with a tape opening 25 through which primary blade 24 of the tape measure mechanism passes. Proximate the forward area of first sidewall 14 is an elongated first slot 18. The slot extends from top wall 13 downwardly, in a direction parallel to a vertical axis, a terminal end 38 that is spaced above the bottom wall 17 and tape opening 25. Similarly, second sidewall 16 is provided with a corresponding second slot 20. The second slot extends downwardly along the second sidewall in a manner identical to the first slot 18. Both slots have a narrow sidewall entrance which expands into a circular passageway for a purpose to be hereinafter described.

The forward portion of the top wall 13 proximate the area between the first and second slots includes a primary blade brake switch. The brake switch rotates about a pivot shaft 35. One end of the switch is secured to a brake arm 36 having a terminal end. The terminal end directly or indirectly frictionally engages primary blade 24 to constrain movement of the blade in a manner known in the art.

Instead of a normal hook-end at the free end of the blade, the present invention provides for a unique end part 28. The end part comprises a plate-like member having an upper target portion 30 and a lower connector tab 32. The connector tab functions in the same manner as a conventional tape measure hook. The target portion may be provided with a target spot 31 for a purpose to be hereinafter described.

Adjacent to the brake switch 34 is a light switch 48. The light switch is part of the housing light means and functions in a conventional manner by electrically connecting a light source 42 with electronic componentry 49 and a power source shown as battery 50. This is accomplished by extending an electrical conductor, shown as wire 46, to the power source and to a light source receptacle 44. The receptacle may contain a conventional bulb and lens system or a laser illumination device. The laser device is preferred because it can focus a narrow light beam 52 over a greater distance.

The light source projects light through an opening 21 in the lower portion of front wall 19. Preferably, the beam of light 52 extends outwardly in a manner parallel to the center longitudinal axis of blade 24 when it is withdrawn from the housing. The light source will have sufficient power and be sufficiently focused to noticeably illuminate the target spot 31 when the spot is several feet away from the source. To facilitate illumination, the target spot may have luminous or reflective characteristics.

The end part target portion 30 may include a hinge 33 at its junction with the connector tab. This will allow it to be moved out of the beam of light emanating from opening 21. In this way, the housing may be used as a light pointer.

Located at the uppermost portion of top wall 13 is a first recess 54 and a second recess 56. Each recess extends parallel to a respective first and second sidewall and provides a protected area for placement of level indicator means shown as respective bubble levels 55,57. The axial alignment of each of the bubble levels define a plane that is parallel to the orthogonal X axis and the longitudinal axis of light beam 52.

At the curved end 60 of primary housing back wall 15, is a lateral recess 62. This recess extends at least across a portion of the back wall width. Secured within the recess is a third indicator means shown as lateral bubble level 64. The longitudinal axis of the lateral bubble level extends along the orthogonal Z axis which is perpendicular to the axis of the first and second bubble levels. It is also perpendicular to light beam 52 and the longitudinal axis of tape measure blade 24.

From the above positions of the level indicators, the primary housing 12 can be rotated about the Z axis so that the primary blade 24 will be horizontal to the ground. The housing can also be leveled laterally by rotation of the housing about the X axis.

With reference now to FIGS. 5–9, the secondary tape measure assembly is shown generally by reference 70. This assembly comprises a casing 72 having an interior within which is enclosed a coiled spring-biased tape measure mechanism constructed in a manner known in the art. The assembly includes a secondary blade 92 having an end hook 94 for releasable attachment to items from which measurements are to be taken.

The casing 72 includes opposing mirror image side panels comprising a first side panel 74 and a second side panel 76. The panels are enclosed with a top wall 78 which merges into a rounded upper corner portion 80. The upper corner portion merges into a rear wall 82 which terminates at lower wall 84. The lower wall extends to a forward wall 86 which is provided with a lower wall opening through which secondary blade 92 extends.

The rounded upper corner of the casing includes a blade lock switch 81. The lock switch functions to temporarily secure the blade at selected extended positions in a manner known in the art.

Extending along the midline of at least a portion of the lower wall 84, is a downwardly extending flange 89. The outer end of the flange is provided with a slot engagement means shown as an enlarged lower projection 88. The lower projection has a circular cross-sectional shape that corresponds to the cross-sectional outline of first and second slots 18,20 of the primary housing 12.

Figure 1:
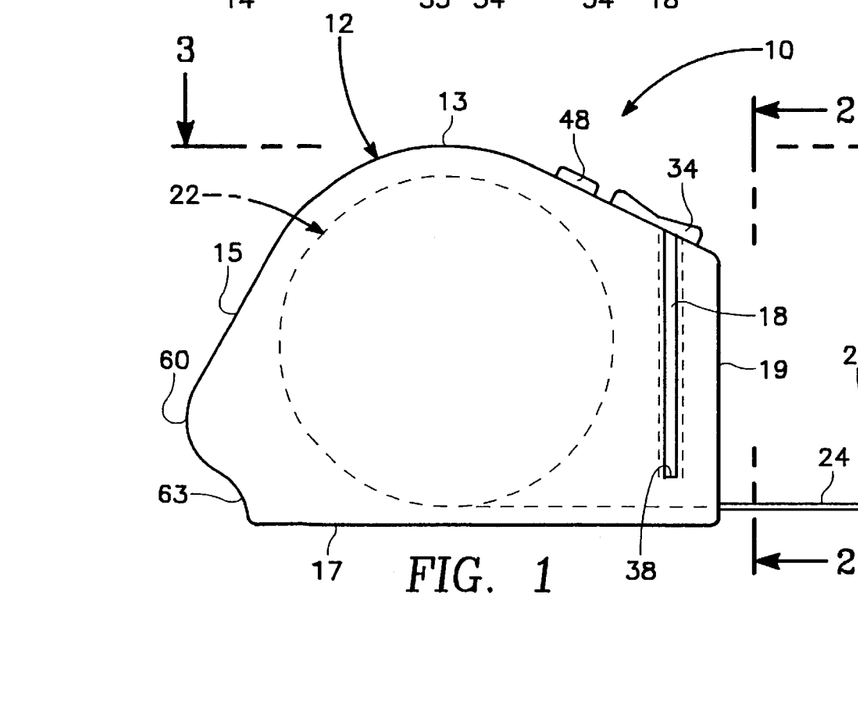
FIG. 1 is a side elevational view of a primary tape measure assembly constructed in accordance with the present invention.
Figure 2:
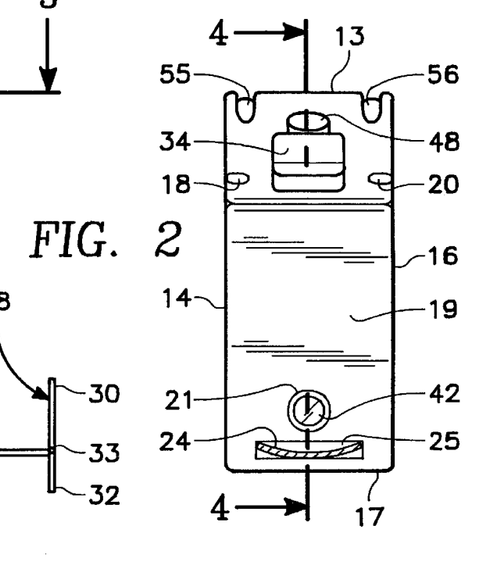
FIG. 2 is a front end elevational view taken along lines 2—2 of FIG. 1.
Figure 3:
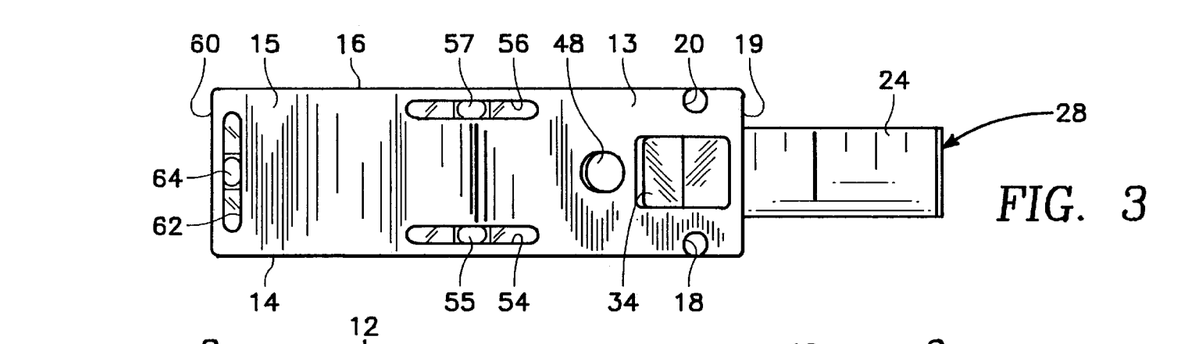
FIG. 3 is a top plan view taken along lines 3—3 of FIG. 1.
Figure 4:
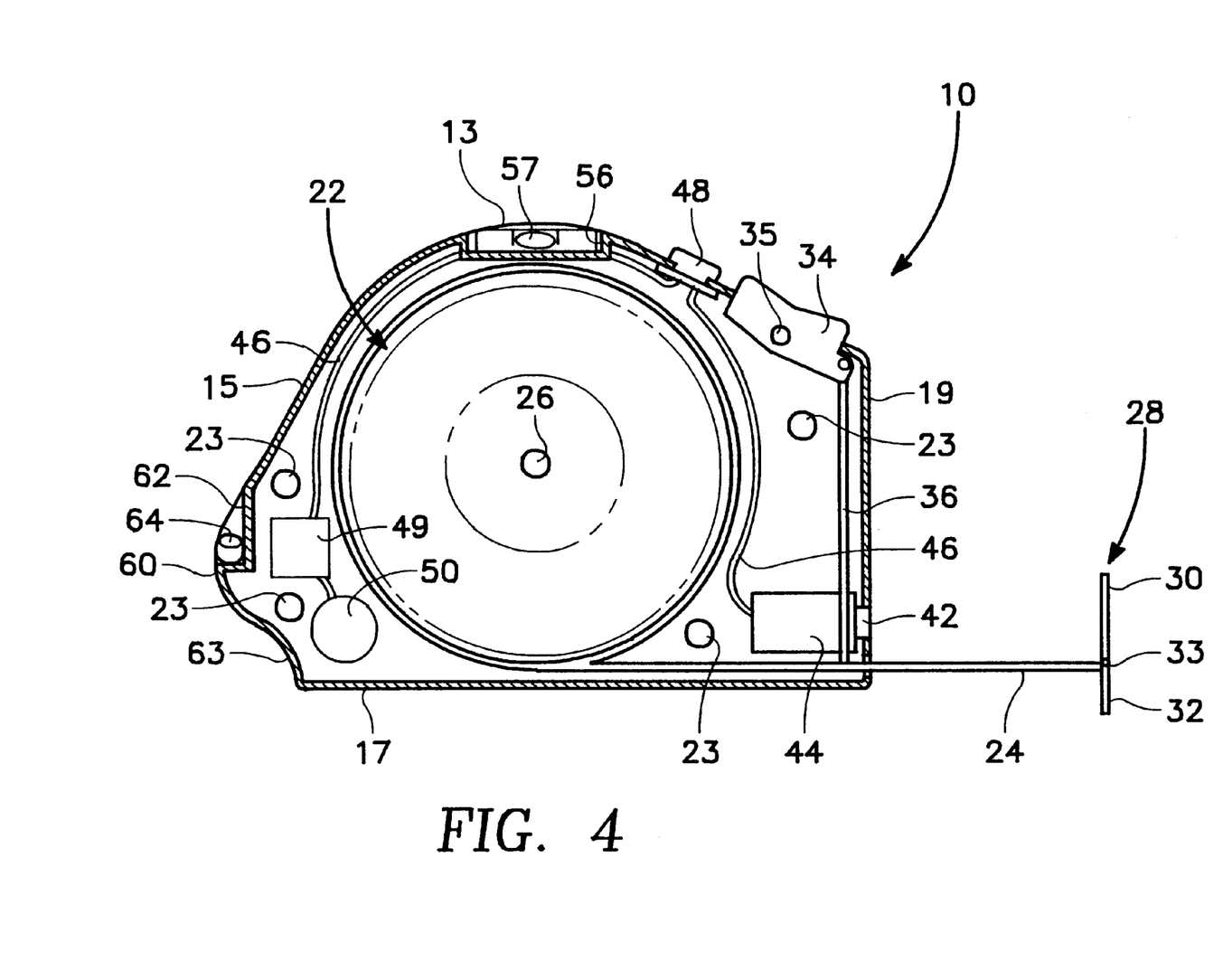
FIG. 4 is a cross-sectional view taken along lines 4—4 of FIG. 2.
Figure 5:
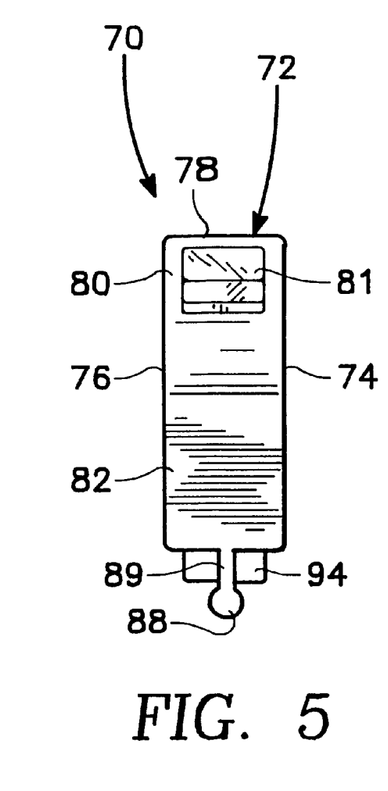
FIG. 5 is a back end elevational view of a secondary tape measure assembly constructed in accordance with the present invention.
Figure 6:
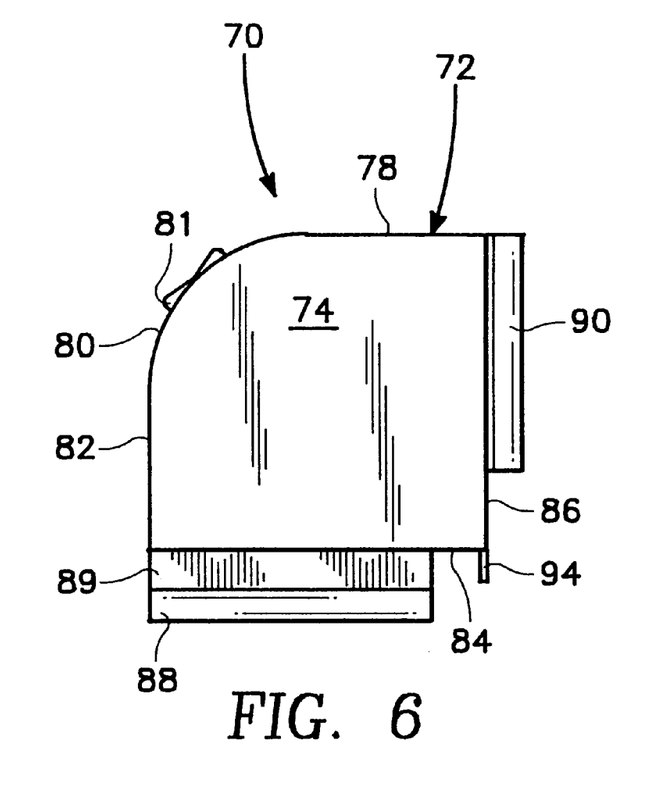
FIG. 6 is a left side elevational view of the secondary tape measure assembly shown in FIG. 5, the right side being identical thereto.
Figure 7:
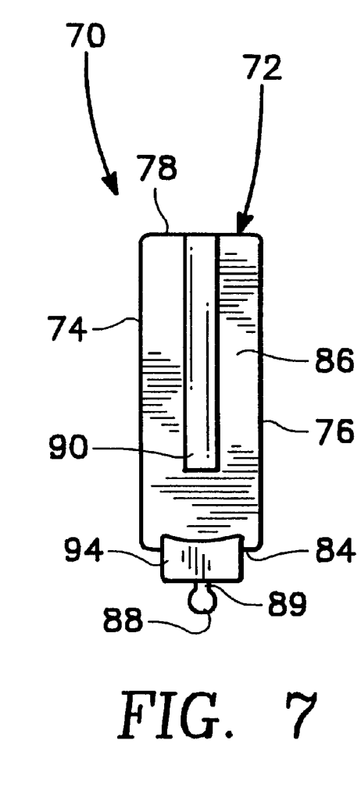
FIG. 7 is a front end elevational view of the secondary tape measure assembly shown in FIG. 5.
Figure 8:
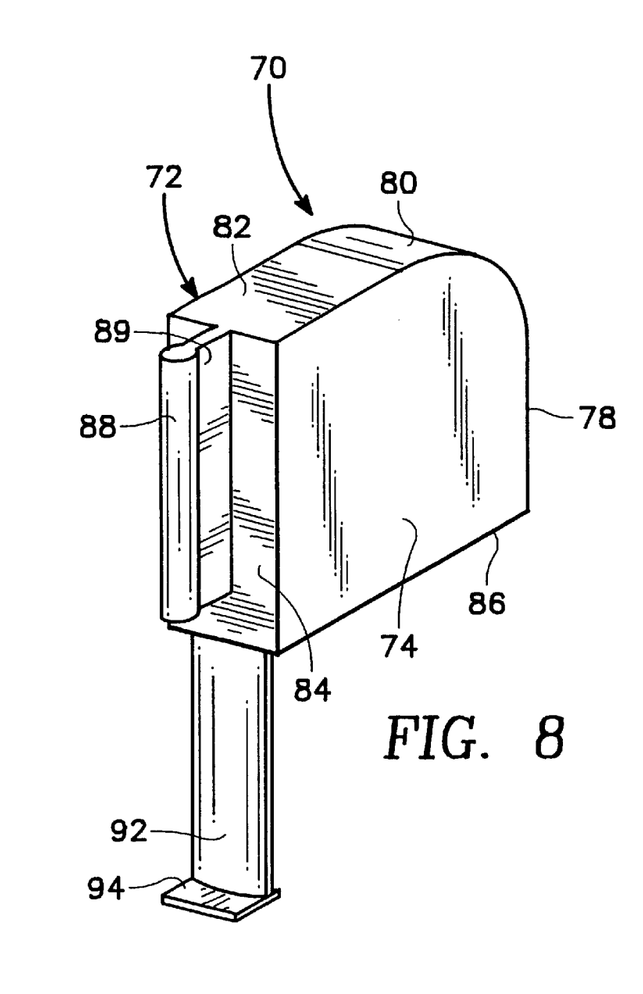
FIG. 8 is an isometric view of the bottom and left side panel of the secondary tape measure assembly shown in FIG. 5 with the secondary measuring tape blade partially extended.
Figure 9:
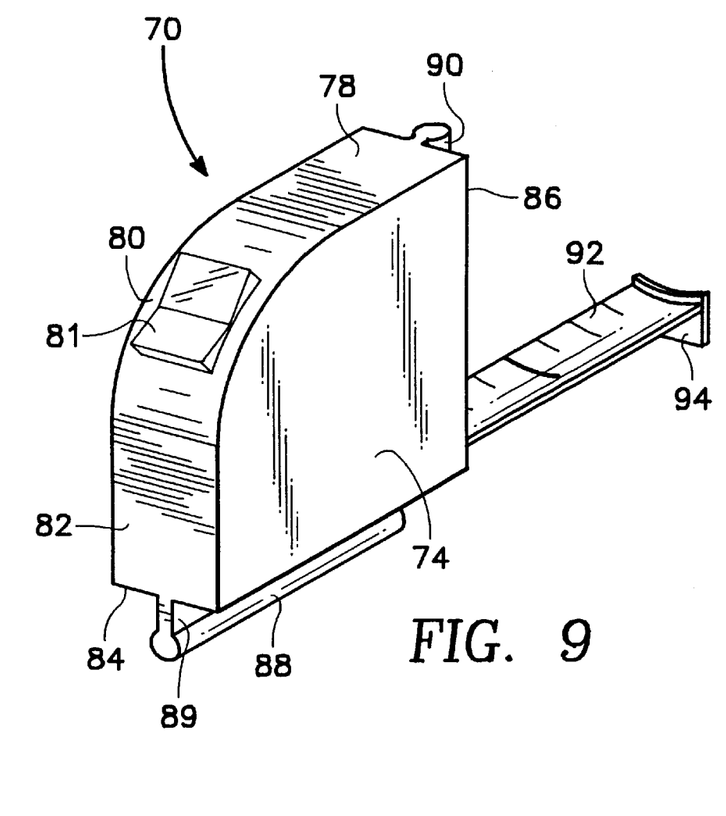
FIG. 9 is also an isometric view of the back end and left side panel of the secondary tape measure assembly shown in FIG. 8.

As best shown in FIG. 6, it is preferred that the flange and lower projection not extend the full length of lower wall 82. Instead it extends from rear wall 82 forward toward front wall 86 a distance sufficient to leave a spacing apart from end hook 94 to permit convenient manual access to the end hook. The width of the flange 89 need only be sufficient to set apart the lower wall 84 and blade 92 from second sidewall 16 of the primary housing 12. The purpose of this spacing is to permit free movement of blade 92 and end hook 94 when the primary and secondary housings are engaged in the Y,X orthogonal orientation depicted in FIG. 10.

Forward wall 86 of the casing 72 is also provided with a slot engagement means shown by forward projection 90. As shown, the forward projection extends from a position adjacent top wall 78 downwardly to a terminal end that is spaced above blade 92. This disposition permits better access to manually engage end hook 94 and prevents interference of the forward projection with operation of the tape.

Figure 12:
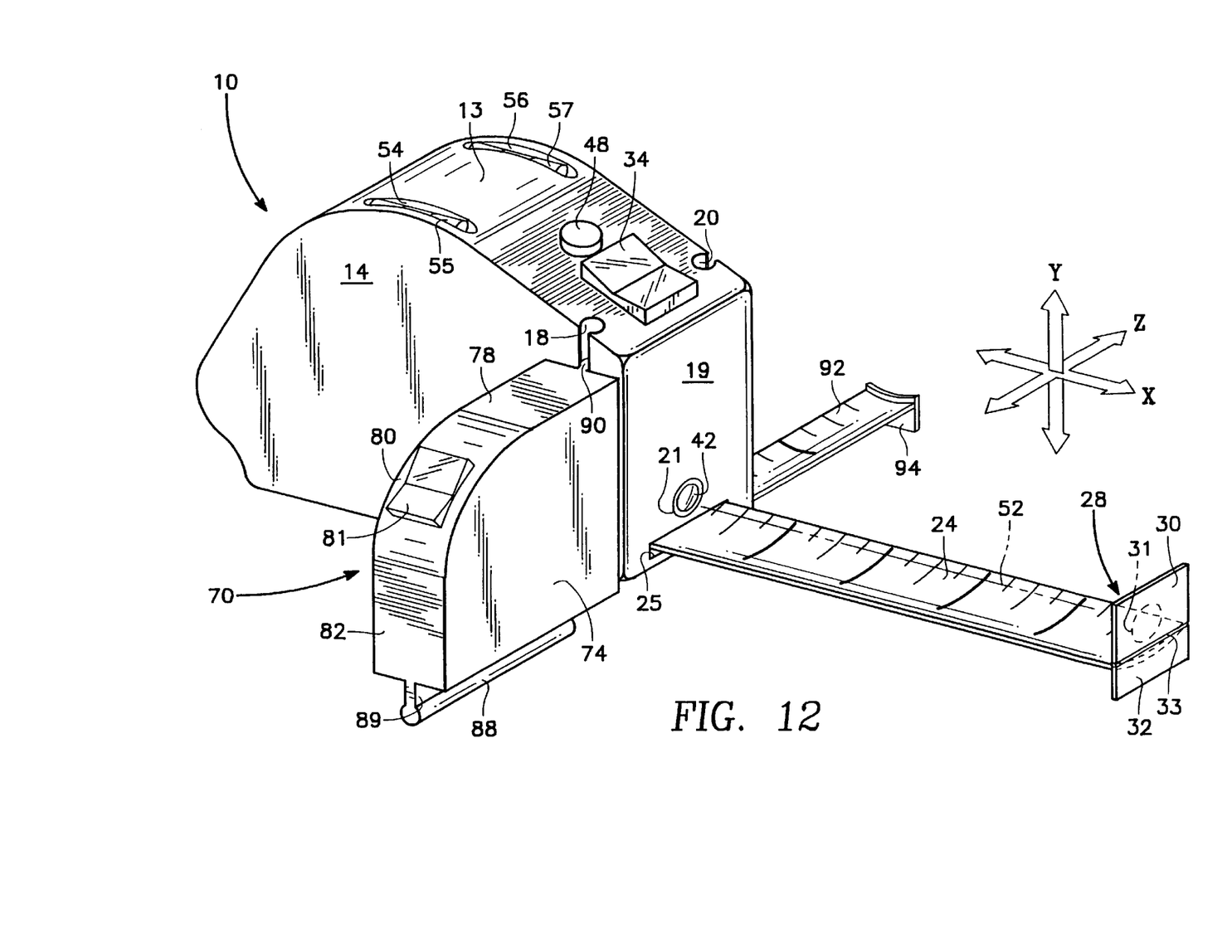
FIG. 12 is an enlarged isometric view of the secondary tape measure assembly combined with the primary tape measure assembly in an alternative orientation whereby the respective extended blades are perpendicular to each other and in parallel planes.

The forward projection 90 does not include a significant flange portion to extend the projection outwardly from wall 86. This permits a closer engagement of the casing with primary housing 12 as depicted in FIG. 12. A tight fit is important to avoid unwanted deviation in the orthogonal alignment of the combined assemblies.

To facilitate sliding engagement, the forward projection will have a cross-sectional shape that corresponds to the cross-sectional outline of the opening of first slot 18. Additionally, the forward projection extends along the center midline of forward wall 86 and the center axis of the lower projection 88 and forward projection 90 along with the center axis of blade 92, define an imaginary plane extending along the Y,Z axis. Also, the lower and forward projections and the first and second slot openings all have the same cross-sectional configuration. This allows either one of the lower or forward projections to be engaged with either one of the first and second primary housing slots.

In operation, the primary tape measure assembly 10 can be used alone to determine the same elevation from the elevation of a known point. This is accomplished by anchoring connector tab 32 to the known point and moving the primary assembly away. The primary blade will be drawn out as the assembly is moved away. Once the location is reached for which an elevation is to be ascertained, the level indicators are observed to ensure the assembly is horizontal and not canted. Light switch 48 is actuated to illuminate light source 42 and emit a light beam 52. While maintaining the assembly level, the light beam is focused upon target spot 31 of the target portion 30. When the spot is illuminated, the primary assembly will be at the same horizontal level as the known point. This procedure is useful in many applications including the attachment of wall decorations and related items to vertical surfaces.

A series of steps similar to the above may be followed when the secondary tape measure assembly 70 is engaged with second slot opening 20. This engagement is shown by arrow A in FIG. 10 indicating movement of lower projection 88 downwardly into second slot 20. In this orientation, blade 92 will extend along the Y axis and blade 24 will extend along the X axis.

Figure 11:
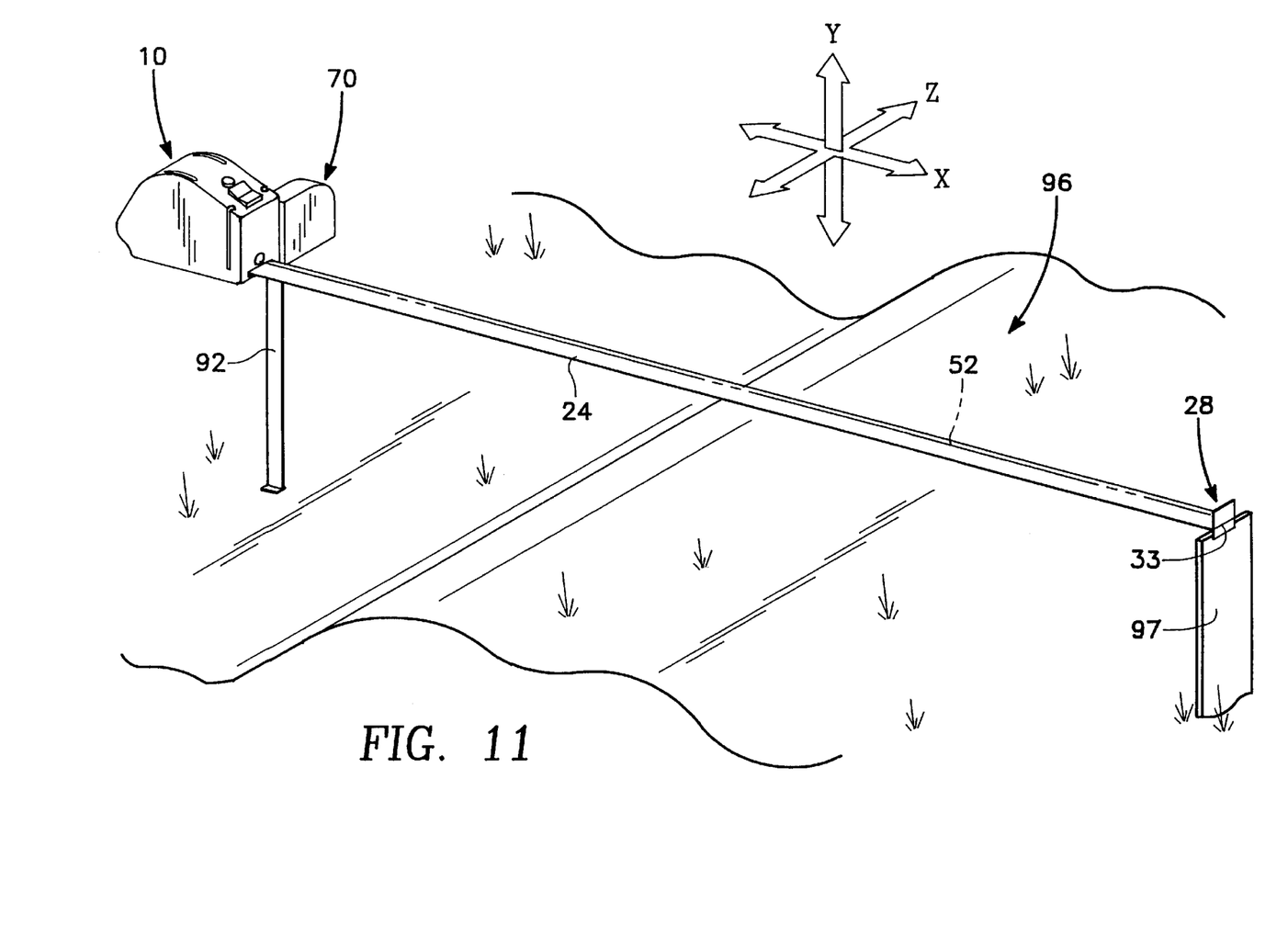
FIG. 11 is an isometric reduced scale view of the combined assemblies oriented as in FIG. 10 being used to check a grade level.

The above orientation is particularly useful for checking and measuring the grade on a construction site. This application is depicted in FIG. 11 wherein the primary blade 24 will measure the distance from grade stake 97 while the grade drop-off can be measured with the downwardly extending secondary blade 92.

Figure 10:
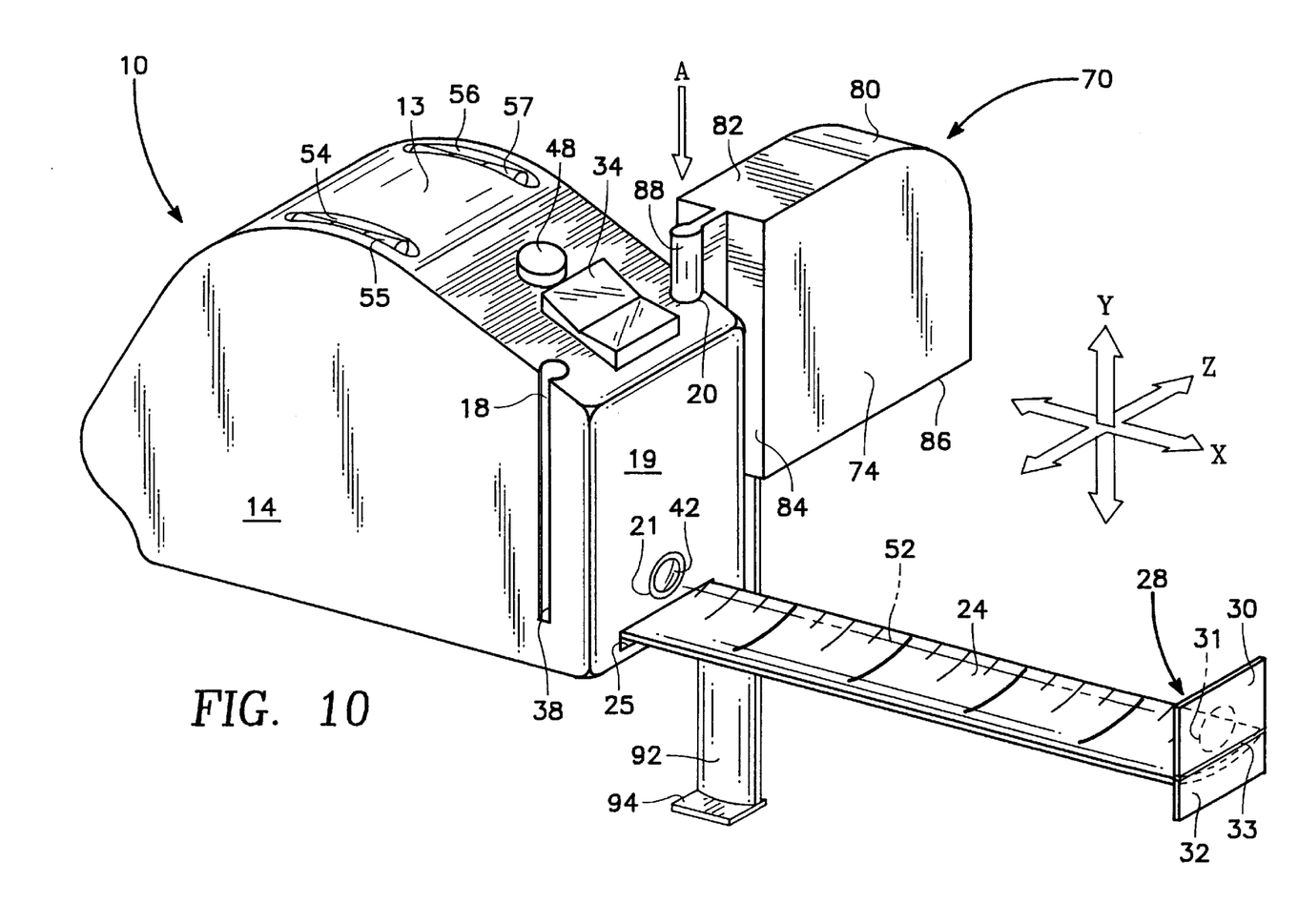
FIG. 10 is an enlarged isometric view of the secondary tape measure assembly being engaged with the primary tape measure assembly in an orientation whereby the secondary blade extends vertically down and perpendicular to the primary blade.

For example, if the grade stake reads that the design elevation is 10 feet offset (10' o/s) and 1.5 feet below top of survey hub ("CUT 1.5"), the grade drop-off should be 1.5 feet at a distance of 10 feet. The connector tab 32 is anchored to the survey stake and the combined assemblies, in the X,Y orientation depicted in FIG. 10, is moved away from the stake in the desired direction, to a length of 10 feet. The level indicator bubbles are observed to ensure that the primary assembly is held horizontal and level. Light switch 48 is pressed to activate light beam 52 and, while holding the tape assemblies horizontal and level, the assembly combination is moved until target spot 31 becomes illuminated by the light beam. Upon illumination, secondary blade 24 is extended to measure the distance to the ground, in this case to check that the distance is 1.5 feet. Using the assembly combination in this manner allows for quick and simple grade measuring and checking.

FIG. 12 shows another preferred embodiment of the invention wherein forward projection 90 is mated with first slot 18 of the primary assembly. This may be referenced as an X,Z orientation wherein secondary blade 92 is slightly below and perpendicular to blade 24. Both blades will extend in offset but parallel planes defined by the X,Z axes. Note that the forward projection 90 could also be mated with second slot 20. In this case, blade 92 would extend along the Z axis in an opposite direction.

The above embodiment is useful to conduct relative horizontal measurements from a known point. For example, the combined assemblies can be rested against a vertical wall structure with bottom wall 17 against the wall structure. Connector tab 32 is then fixed to a known point. The tape combination is moved horizontally away from the known point while extending primary blade 24. Upon reaching the desired measured distance for a new point, the light switch 48 is pressed activating the light source 42. The combined tapes are then moved up and down until light beam 52 illuminates target spot 31. While the spot remains illuminated, the tapes are further moved while watching the level indicator. When a horizontal level is achieved, the measured new point can be marked. It will be at the same level as the known anchor point.

At desired intervals, the wall could be marked to show points on the same level as the known point. Alternatively, at desired intervals, secondary blade 92 can be extended to a desired length for marking points perpendicularly below or above a selected level, depending on whether the secondary assembly is connected to the first or second slot of the primary assembly.

Although the present invention has been described in considerable detail with reference to certain exemplary configurations thereof, other versions are possible. Therefore, the spirit and scope of the appended claims should not be limited to the specific versions contained herein.

I claim:

1. A measuring system comprising:
   the combination of a primary tape measure assembly having a housing with an extendable primary measuring blade and a secondary tape measure assembly having a casing with an extendable secondary measuring blade, said housing and said casing each having corresponding mounting structures that are releasably engaged to each other so that said secondary measuring blade and said primary measuring blade will extend in different directions; and,
   said housing including a light source that emits a light beam parallel to the longitudinal axis of said primary measuring blade.

2. The system of claim 1 wherein said secondary and primary measuring blades extend in different orthogonal directions.

3. The system of claim 2 wherein said primary measuring blade extends along an X axis and said secondary measuring blade extends along a Y axis.

4. The system of claim 2 wherein said primary measuring blade extends along an X axis and said secondary blade extends along a Z axis.

5. The system of claim 1 wherein said primary measuring blade includes an end part having a target portion for illumination by said light beam.

6. The system of claim 1 wherein said primary tape measure assembly includes a level indicator means for indicating when said light beam is horizontal.

7. The system of claim 6 wherein said primary measuring blade extends longitudinally along a horizontal axis.

8. The system of claim 6 wherein said level indicator means indicates when said light beam is horizontal and when said secondary measuring blade is horizontal or vertical.

9. A grade/level measuring device, comprising:
   a means on said device for determining whether said measuring device is horizontal;
   a light source on said device for determining whether said measuring device is at the same level as a known point when said device is horizontal;
   a first measuring means for measuring the horizontal distance between said device and said known point, said first measuring means being enclosed within a housing having a first mounting structure; and
   a second measuring means for measuring the distance between said measuring device and a selected point, said second measuring means being enclosed within a casing having at least a second mounting structure engageable with said first mounting structure so that said second measuring means will be perpendicular to said first measuring means.

10. The measuring device of claim 9 wherein said first measuring means comprises a retractable primary measuring blade and said second measuring means comprises a retractable secondary measuring blade such that the extended secondary measuring blade is either vertical and perpendicular to said primary measuring blade or perpendicular and in a horizontal plane that is parallel to the primary measuring blade.

11. The measuring device of claim 10, wherein said primary tape measure assembly has opposing sides and said first mounting structure comprises a vertical slot in at least one of said sides and said second mounting structure comprises a mating projection extending from said casing.

12. The measuring device of claim 11 wherein said first mounting structure comprises a vertical slot in each of said sides.

13. The measuring device of claim 12 wherein said casing has a lower wall and a forward wall, said mating projection comprising a lower projection extending from said lower wall and a forward projection extending from said forward wall.

14. The measuring device of claim 10, wherein said light source provides a light beam adjacent and parallel to said primary measuring blade.

15. The measuring device of claim 14 wherein said primary measuring blade has a free end that includes an end part having a target portion which comprises said known point, said light beam being capable of illuminating said target portion.

16. The measuring device of claim 9, wherein said means for determining if said measuring device is horizontal comprises one or more bubble levels mounted on said housing.

17. The measuring device of claim 16 wherein said housing has two bubble levels to detect horizontal alignment and one bubble level to detect lateral alignment.

18. A primary tape measure assembly comprising:
   a housing having a longitudinal axis and a vertical axis perpendicular to said longitudinal axis;
   said housing including a mounting means aligned parallel to said vertical axis for releasably engaging a secondary tape measure assembly;
   a level indicator means for determining the horizontal alignment of said longitudinal axis;

a tape measuring apparatus in said housing comprising a measuring blade that is extendable from said housing in a direction parallel to said longitudinal axis; and, said housing including a light source that emits a light beam adjacent said blade in a direction parallel to said longitudinal axis.

19. The assembly of claim 18 wherein said housing includes an electrical power source and a light switch in communication with said light source.

20. The assembly of claim 18 wherein said level indicator means comprises a bubble level aligned parallel to said longitudinal axis.

21. The assembly of claim 20 wherein said housing has a lateral axis perpendicular to both of said longitudinal and vertical axes, said level indicator means including a lateral bubble level aligned parallel to said lateral axis.

22. The assembly of claim 18 wherein said mounting means is a member selected from the group consisting of mechanical fasteners, hook fasteners, cloth fasteners, clamps, magnets, matching undercut structures and clips.

23. The combination of a primary tape measure assembly that is releasably engaged to a secondary tape measure assembly, said primary tape measure assembly comprising a housing having a longitudinal axis and a vertical axis perpendicular to said longitudinal axis, said housing including a light source that emits a light beam in a direction parallel to said longitudinal axis and a level indicator means for determining the horizontal alignment of said longitudinal axis;

a primary measuring blade in said housing that is extendable from said housing in a direction parallel to said longitudinal axis; and, said secondary tape measure assembly comprising a casing releasably connected to said housing having a secondary measuring blade that is extendable in a direction perpendicular to said longitudinal axis.

24. The combination of claim 23 wherein said secondary measuring blade is extendable in a direction parallel to said vertical axis.

25. The combination of claim 23 wherein said light source is located adjacent said primary measuring blade.

26. The combination of claim 25 wherein said primary measuring blade includes an end part having a target portion that is illuminated with said light beam.

\* \* \* \* \*

UNITED STATES PATENT AND TRADEMARK OFFICE
CERTIFICATE OF CORRECTION

PATENT NO.    : 6,223,446 B1
DATED         : May 1, 2001
INVENTOR(S)   : Mark H. Potter It is certified that error appears in the above-identified patent and that said Letters Patent is hereby corrected as shown below:

<u>Title page,</u>
Item [76]:
Inventor: Mark H. Potter, 5244 Neptune Sq., Oxnard CA (US) 93035

Signed and Sealed this

Nineteenth Day of February, 2002

*Attest:*

*Attesting Officer*

JAMES E. ROGAN
*Director of the United States Patent and Trademark Office*